(12) United States Patent
Scanlon et al.

(10) Patent No.: US 7,389,152 B2
(45) Date of Patent: Jun. 17, 2008

(54) HIGH SPEED IMAGE SCANNER

(75) Inventors: Edward F. Scanlon, Enfield, CT (US); Michael McAuliffe, Ellington, CT (US); Lee Zuidema, Lebanon, CT (US); Michael Wiggins, South Windsor, CT (US); Alfred Basso, Winsted, CT (US)

(73) Assignee: Scan-Optics Inc., Manchester, CT (US)

( * ) Notice: Subject to any disclaimer, the term of this patent is extended or adjusted under 35 U.S.C. 154(b) by 348 days.

(21) Appl. No.: 11/145,319

(22) Filed: Jun. 3, 2005

(65) Prior Publication Data

US 2005/0274914 A1    Dec. 15, 2005

Related U.S. Application Data

(60) Provisional application No. 60/577,293, filed on Jun. 4, 2004.

(51) Int. Cl.
  G05B 19/18    (2006.01)
  G06K 9/20    (2006.01)

(52) U.S. Cl. .......................... 700/59; 382/317; 382/321

(58) Field of Classification Search .................. 700/59, 700/56, 58, 60–64
See application file for complete search history.

(56) References Cited

U.S. PATENT DOCUMENTS

| | | | | |
|---|---|---|---|---|
| 5,541,834 A | * | 7/1996 | Tomigashi et al. | 700/59 |
| 5,590,059 A | * | 12/1996 | Schier | 702/151 |
| 6,089,750 A | * | 7/2000 | Murakami et al. | 374/124 |
| 6,298,275 B1 | * | 10/2001 | Herman, Jr. | 700/130 |
| 6,434,439 B1 | * | 8/2002 | Raffoni | 700/95 |
| 6,591,147 B2 | * | 7/2003 | Nakane | 700/29 |
| 6,678,067 B1 | * | 1/2004 | Reda et al. | 358/1.14 |
| 6,701,197 B2 | * | 3/2004 | Ben-Ezra et al. | 700/59 |
| 6,771,396 B1 | * | 8/2004 | Cheatle et al. | 358/474 |
| 7,046,404 B2 | * | 5/2006 | Cheatle et al. | 358/450 |

* cited by examiner

*Primary Examiner*—Thomas K Pham
(74) *Attorney, Agent, or Firm*—Alix, Yale & Ristas, LLP

(57) ABSTRACT

A document image scanner; a camera having a field of view, for sensing differentiated information areas on each physical document as the physical document is transported; an image processing system associated with the camera, for producing a virtual image data file from the differentiated information areas sensed by the camera; sensors for determining the position of the physical document relative to the camera field of view; of electro-mechanical devices for actuating the transporter; and a data interface controller for receiving data from the sensors and controlling the electro-mechanical devices. A communications link is provided between the data interface controller and the image processing system for synchronization by the data interface controller, of the physical document as conveyed and the virtual document image captured by the image processing system.

16 Claims, 4 Drawing Sheets

HIGH SPEED IMAGE SCANNER

RELATED APPLICATION

This application claims priority under 35 USC § 119 (e), from Provisional Application No. 60/577,293 filed Jun. 4, 2004, the entire disclosure of which is hereby incorporated by reference.

BACKGROUND OF THE INVENTION

The present invention relates to image scanners, and particularly to portable high speed image and optical character recognition scanners that can flexibly handle intermixed documents of varying sizes.

Scanners of this type have been available for a number of years. The main functional components are the document transporter, the camera, the transport sensing and control, the image capture and processing, and the operator interface for job control. Typically, an analog to digital converter (A/D converter) provides a data interface for the sensors and the electromechanical devices of the transporter. A general-purpose computer (personal computer, or PC) contains software programs for performing the operator interface, interacting with the A/D converter to identify physical and positional aspects of the document, and controlling the timing of the camera, as well as special dedicated boards for image capture and control. A multiplicity of distinct, fixed-logic controller boards interact with the A/D converter to implement transport control logic through respective electromechanical devices.

The present inventors have identified two main disadvantages to the conventional scanner system as described above.

First, there is a high cost in hardware, programming, and maintenance for providing a multiplicity of distinct fixed-logic controller boards, each associated with one of a multiplicity of transporter related control functions to be performed by the system. The chips on each board must be programmed and the board fabricated. Moreover, if an operational problem is encountered by the user, the diagnosis often requires inspection of several boards to find the problem. The service provider must maintain a large number of boards in inventory, so that whichever one of the multiplicity of boards that is defective, can be readily replaced.

Second, there is programming duplication because many of the physical and positional aspects of the document derived from the A/D converter must be used in both the PC and the controller boards, but the programming must be performed independently as between the software based PC and the fixed-logic of the controller boards. The further consequence is that any improvement in software processing capability that can be readily implemented in or by replacement of the PC, cannot be readily implemented in parallel in the fixed-logic boards.

SUMMARY OF THE INVENTION

In one aspect, the present invention consolidates the functionality of the multiplicity of distinct, fixed-logic controller boards that interact with the A/D converter to implement transport control logic through respective electromechanical devices, into one software programmable processor.

This improvement avoids the need to program individual chips and fabricate individual boards. If the user encounters an operational problem traceable to the control of the transporter, the most cost-effective remedy would be to replace the programmed processor. Although the primary, image processing PC and the programmable position control processor may run under different operating systems, a common source code can be compiled in the two different forms usable by the two different operating systems. Any improvements to the algorithms can thus be readily implemented essentially simultaneously via software in the PC and the programmable control processor, whereas the fixed-logic in the conventional controller boards cannot be modified by software.

In another aspect, the use of a programmable processor for control of the transporter facilitates the sharing of common source code for the logical handling of the physical and positional aspects of the document as derived from the A/D converter. A communications link between the position date interface processor or controller associated with transport and the image processor associated with the camera, permits synchronization by the position data controller of the physical document as conveyed and the logical or virtual document (image capture of that page) by the image processing program.

In one embodiment, the invention is directed to a document image scanner having a transporter for conveying physical documents in spaced serial relation along a working distance; a camera having a field of view along the working distance, for sensing differentiated information areas on each physical document as the physical document is conveyed; an image processing system operatively associated with the camera, for producing a virtual image data file from the differentiated information areas sensed by the camera on the physical document; sensors for determining the position of the conveyed physical document relative to the camera field of view; a plurality of electro-mechanical devices for actuating the transporter; and a data interface controller for receiving data from the sensors and controlling the electro-mechanical devices to transport the physical document; wherein the improvement comprises a communications link between the data interface controller and the image processing system for synchronization by the data interface controller, of the physical document as conveyed and the virtual document image captured by the image processing system.

In another embodiment, the invention is directed to a high speed document image scanner having a transporter for conveying documents in spaced serial relation along a working distance, a selectively triggered camera having a field of view along the working distance, for sensing differentiated information areas on each document as the document is conveyed, and a first data processing system under the control of a first operating system and operatively associated with the camera, for producing an image data file from the differentiated information areas sensed by the camera. A sensor determines the position of the conveyed document relative to the camera field of view. A plurality of electromechanical devices actuate the transporter, and data interface means are associated with the electro-mechanical devices. A first computer program executable in the first data processor, controls the production of the image data file representative of the differentiated information areas on each document, and a second data processor under the control of a second operating system is logically associated with the data interface means. A reprogrammable second computer program executable in the second data processor, receives input signals responsive to the sensed operating variables, and based on the sensed operating variables sends control signals to the electro-mechanical devices for controlling the transporter.

Preferably, the second data processor delivers a signal to the first computer program through a serial or similar data communications link, for timing the production of an image data file representative of the differentiated information areas on each document from the camera subsystem. Also in response to the sensed operating variables, the reprogrammable second computer program can optionally send a trigger control signal to the camera subsystem. Ideally, the image is not fully processed in the primary computer system, until the secondary computer system confirms that the document has been successfully delivered to the stacker.

Other advantageous features and combinations of features are described and claimed hereinafter.

DESCRIPTION OF THE PREFERRED EMBODIMENT

Figure 1:
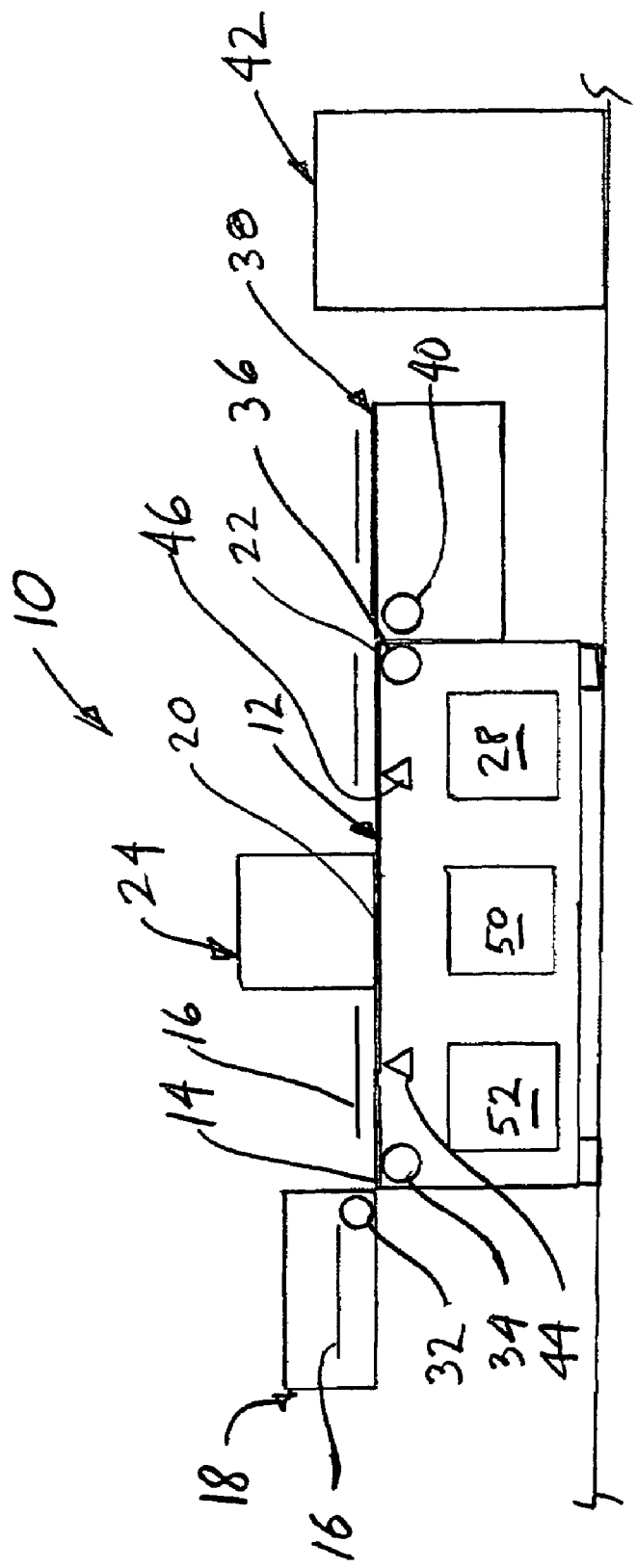
FIG. 1 is a schematic elevation representation of a scanner system according to the invention.
Figure 2:
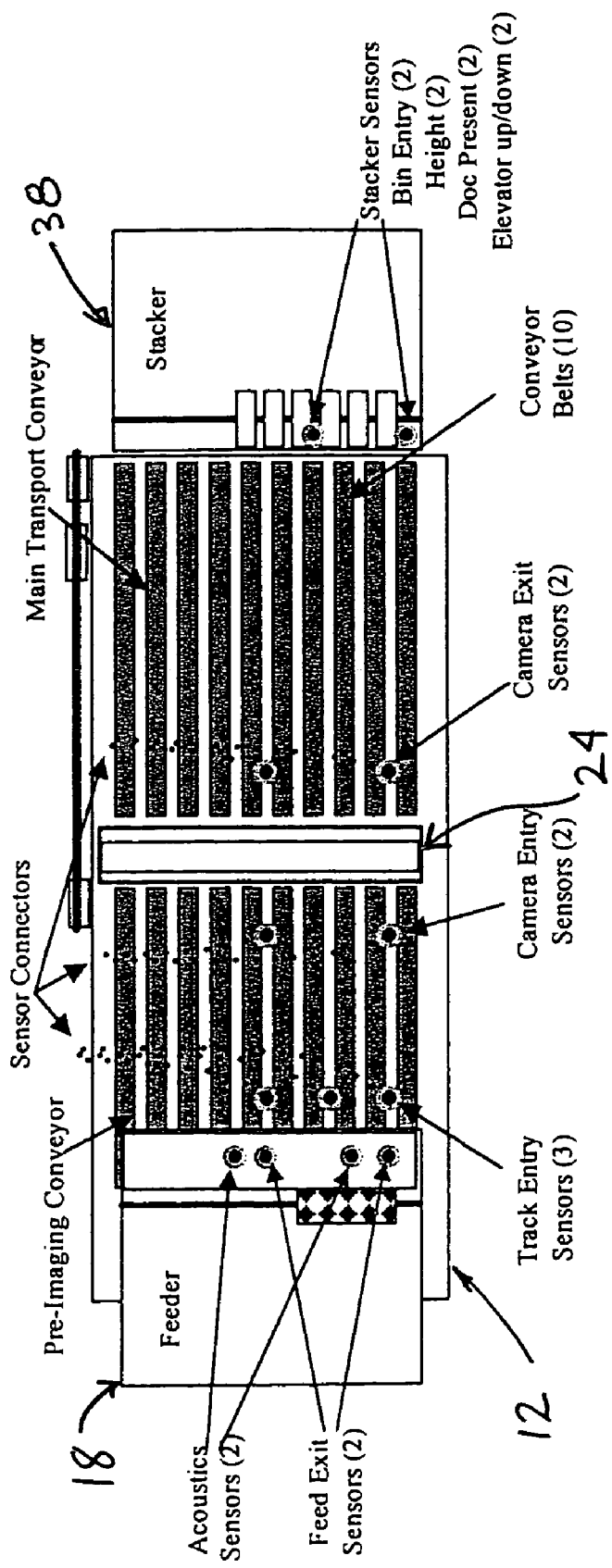
FIG. 2 is a schematic representation of the transporter portion of the system of FIG. 1, viewed from above, showing the locations of typical sensors.

FIGS. 1 and 2 show a high-speed image scanner according to an embodiment of the present invention. A document transporter 12 has an input end 14 for receiving a continual stream of discrete documents 16 of varying size from a feed source 18, a central portion 20 for conveying the documents in spaced serial relation along a working distance, and a discharge end 22 including a stacker or the like 38. Camera means 24, 26 are situated along the central portion of the transporter, for sensing differentiated information areas on each document as the document is conveyed, and generating a digitized sampling of said areas. The cameras can be one or both of a general image scanner, or an optical character recognition scanner, as are well known in this field of technology. A first data processor 28 under the control of a first operating system is logically associated with the camera (s) for receiving the digitized samplings and producing an image data file representative of the differentiated information areas on each document.

A first computer program is executable in the first data processor, for controlling the timing of the receipt of the digitized samplings in the first data processor and the production of an image data file representative of the differentiated information areas on each document. The receipt of the digitized samplings occurs the same time number 48 is polling the image sub system to see if the images are complete and gets a positive knowledge that the image is complete.

The conveying is preferably performed by two distinct endless belt configurations, one upstream of the camera and the other downstream of the camera, with a space between the conveyors so the camera can scan from above and below the document as it passes from one belt to the other. Each belt is formed from a plurality of narrow, laterally spaced belt segments, which accommodates sensors situated below the belt for sensing aspects of a document on the belts.

A plurality of sensors are mounted on the transporter, for sensing operating variables including (1) the entry of a document from the feeder onto the conveyor belt, (2) the boundaries of the document, (3) the leading edge of the conveyed document as it enters the camera field of view, (4) the trailing edge of the conveyed document as it exits the camera field of view, (5) the entry of a document into the stacker, and (6) the height of the stack of documents and other conditions in the stacker. Optionally, acoustic sensors can be provided for use in detecting a double document feed. The various sensors are generally represented at 44 and 46 in FIG. 1, and are more particularly identified in FIG. 2

Other sensors are mounted on the transporter for sensing secondary information on each document, such as a patch code reader, bar-code reader, and/or MICR reader. Also, an ink jet or similar printer device may be mounted on the transporter, for marking each scanned document with a reference number or the like. Some or all of these may receive and implement control signals, as simple as "on-off".

A plurality of electromechanical devices are associated with the transporter, for receiving and implementing control signals for adjusting important operating variables including conveying speed, document feeder actuating, document stacker actuation, and camera position. In FIG. 1, feeder motor 32, conveyor motors 32 and 36, and stacker motor 40 are shown as representative of the electromechanical devices.

As is well known in the control of electromechanical systems, sensors typically respond to a measured variable in real time, using a transducer that generates an analog signal commensurate with changes in the variable. Electromechanical devices such as motors and the like, respond directly to analog control signals. However, where the sensed variables are to be used in a digital control algorithm, the analog signal from the sensors must be converted to digital equivalent and the digital output of the control algorithm must be converted to an analog control signal for the electromechanical device. This data interface conversion is performed in an A/D converter, shown at 52, which does not normally contain any control intelligence.

The locations, performance, and purposes of the cameras, sensors and electromechanical devices are substantially similar to those found in presently available scanner systems available from Scan Optics, Inc., Manchester, Conn. U.S.A.

A key aspect of the present invention, is the consolidation of the functionality of prior art distinct, fixed-logic controller boards, into one software programmable processor 50. This second data processor 50 is under the control of a second operating system and is logically associated with the means for sensing operating variables and the electromechanical devices, whereby the transporter functionality is controlled in a single source that has reprogrammable logic. The second computer program 54 is executable in the second data processor, (1) for receiving input signals responsive to the sensed operating variables, (2) based on the sensed operating variables, computing and sending control signals to the electro-mechanical devices for the operating variables. Preferably it also provides data communication to the camera and/or image sub-systems whereby the first computer program 48 controls the receipt of the digitized samplings in the first data processor 28 and the production 30 of an image data file representative of the differentiated information areas on each document after the stacker complete is indicated via serial link.

The first data processor is preferably a general purpose PC under a Windows XP operating system and the second data processor preferably is a programmable multithread real time transport controller under a Win CE operating system. The first computer program includes a first sheet manager program defined by a series of coded logic instructions, the second computer program includes a second sheet manager program defined by a series of coded logic instructions, and at least some of the first and second sheet manager programs have identical coded logic instructions. The use of a programmable processor for control of the transporter facilitates the sharing of common source code for respective sheet manager programs as dependent on data derived from the A/D converter. Although the PC and the programmable control processor may run under different operating systems, a common source code can be compiled in the two different forms usable by the two different operating systems. There are several common modules that create the logic and functions of the sheet manager process. This source code is shared between the first and second processors via compilation under the ".NET Windows" environment for the first processor and compilation as part of the imbedded project under "eVC" for the software running in the transport controller.

A further advantage is that the digitized data from the A/D converter can be delivered only to the transport controller, which in turn can supply the data to the first processor. This simplifies the system architecture and assures that both processors are using the same data for their respective sheet management programs.

Figure 3:
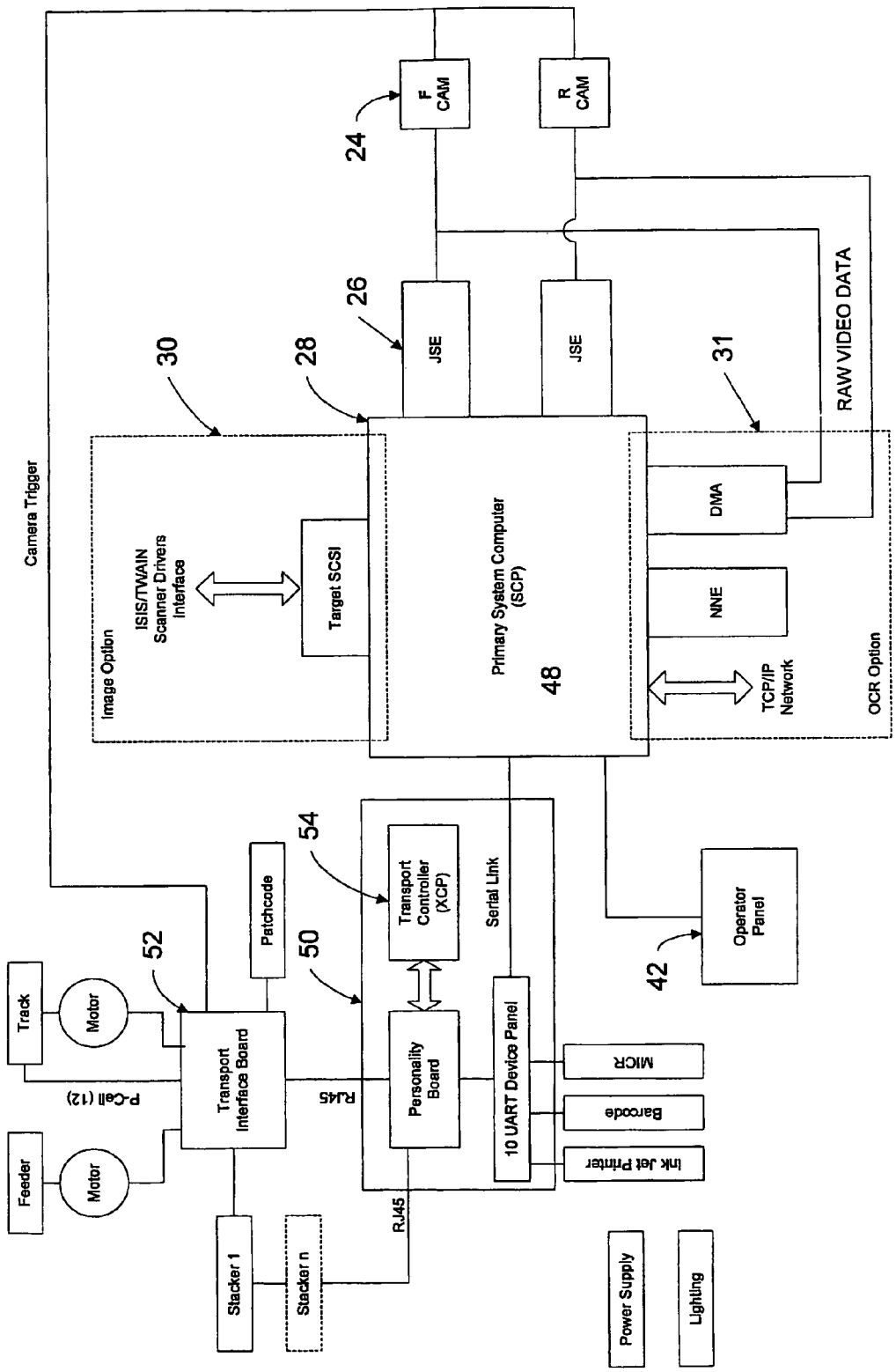
FIG. 3 is a block diagram representing the data processing architecture according to the preferred embodiment of the invention.

FIG. 3 shows the program modules 26 for controlling the operation of upper and lower (front and rear) cameras 24. The differentiated (i.e., contrasting) areas sense by the cameras are processed through an image board or the like 30 associated with the primary system computer 28. Optionally, the raw video data is passed through an OCR module 31, which is also associated with the primary system computer. The primary system computer is under the overall job control of an operator panel 42, which may also include a separate personal computer or terminal on a network with server, in a manner that is well known in the art and is not of significance to the present invention. Although in FIG. 3 both the Image option and OCR option are associated with a given scanner system configuration such as depicted in FIG. 1, it should be appreciated that a particular end user may have a need for only an imaging scanner or only an OCR scanner and therefore the system would be configured to perform only one of these purposes. The present invention however is not dependent upon whether the camera and associated primary system computer are configured to perform one or both of these types of scanning operations.

The second processor 50 is preferably comprised of a so called "personality board" and a transport controller 54. The transport controller (XCP) is the board that contains the X scale processor (XCP), the WinCE operating system and SME software that runs the transport. A suitable XCP is available from Applied Data Systems, and the WinCE is available from Microsoft Corporation. The personality board is a bus interface card that the XCP plugs into which provides the board with physical connectors to the other devices. The personality board (BPM) has the physical serial, USB, RJ45, and serial panel connectors to allow the system to be wired. The BPM firmware provides the bus and address space management used by the XCP software to talk with the transport interface board (TIB) 52 through the compact flash bus interface of the XCP. The sheet management embedded (SME) program is the software control point for the transport controller, i.e., to monitor and control the transport devices. The SME program can be written in any programming language, such as C++, and is thus reprogrammable to cure defects in or provide upgrades to the control of the transport hardware. In some cases these upgrades would be made in parallel with upgrades in the primary computer software program.

The transport interface board 52, which provides the A/D data conversion, is directly linked to the electro-mechanical devices such as the feeder motor and the conveyor belt or track motor, and the sensor cells indicated by P-cells, as well as one or more stackers and patch code reader. The P-Cells (photo cell sensors) are connected to the transport through the interface 52. To the extent any of the devices associated with the transporter operate entirely digitally, such as the ink-jet printer, the bar code reader, and the MICR, these can be interfaced directly with the second processor 50.

Figure 4:
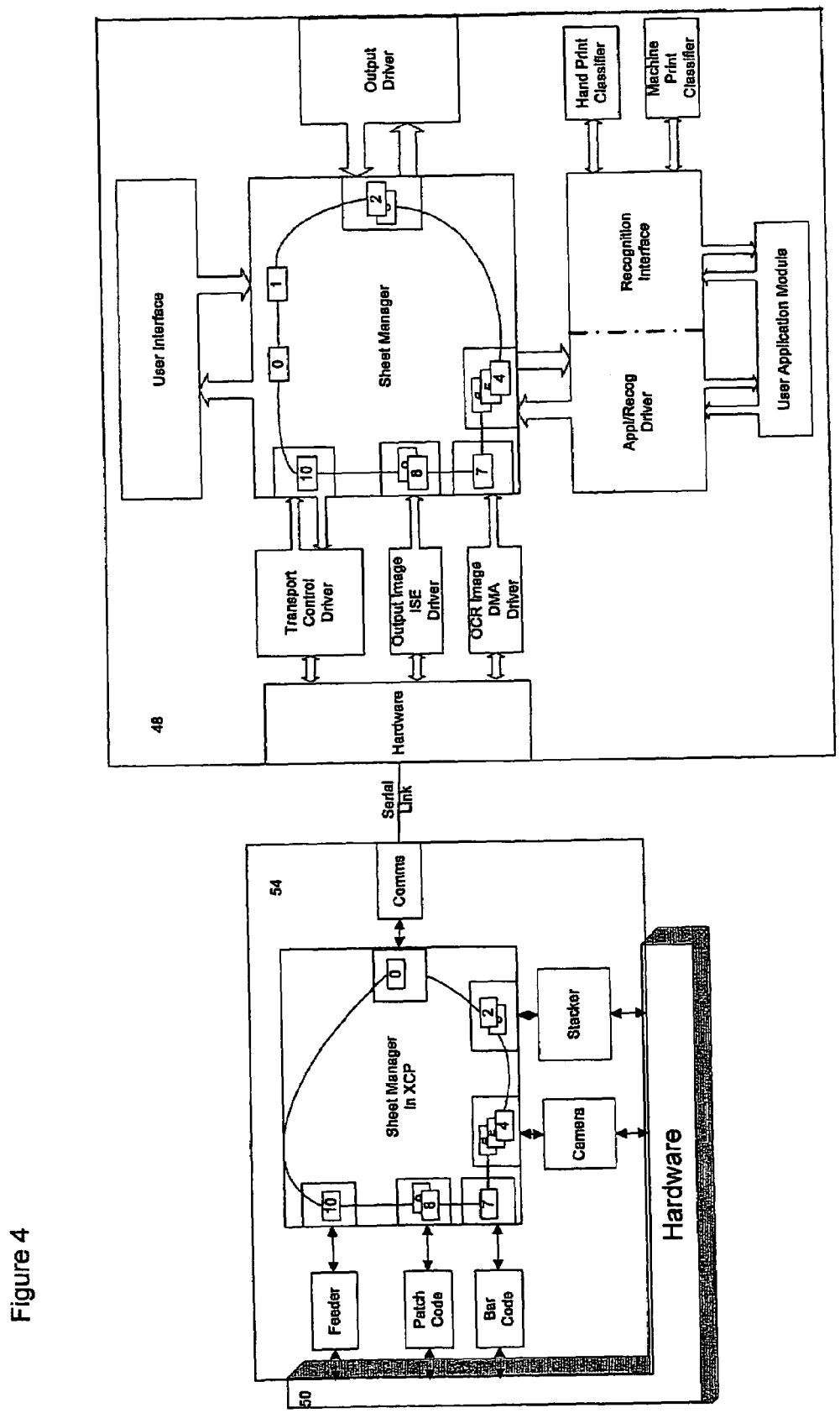
FIG. 4 is a schematic representation of the computer program control of the hardware functionality for managing the sheet containing an image to be captured.

FIG. 4 is a schematic of how the sheet manager logic in program 48 controls the physical hardware represented at 54 and which, in conjunction with FIGS. 1-3, represent the image option and OCR options in more detail.

In the image option sequence, the XCP 54 tracks the document, by the leading edge up to the amount of pre and post capture value (for example, 1.5 inches) before the camera. Then it triggers the camera for a valid frame signal. The valid frame signal gets passed on to the image sub system board 26, which starts capturing video. The XCP 54 continues to track the document until the trailing edge is past the camera for the post capture value. The XCP 54 de-asserts the trigger for a valid frame signal. After the de-assert, the image subsystem 26 corrects for skew and crops, rotates and compresses the captured image of the document. At the same time the first program 48 is polling the image sub system 26 to see if the images are complete. When an image is reported as complete it requests the image be transferred to the primary program 48. At the completion of the image transfer to program 48, a stacker complete message is sent across the serial link from XCP 54 to SCP 48. The image subsystem boards can then report that the image is complete. The data are queued up for the SCSI device. The image is not available for output to the SCSI (or Network per below) until the program 48 receives confirmation that the document has been successfully added to the stacker. The SCSI device is polled by the outside computer for data or problems.

In the OCR option sequence, the XCP 54 tracks the document by the leading edge up to the amount of pre and post capture value before the camera. Then it triggers the camera for a valid frame signal. The valid frame signal is passed on to the image sub system board 26 and the direct memory access (DMA) board in 31. The image sub system board 26 and the DMA 31 starts capturing the video directly into the program 48. The program 48 polls the DMA 31 board for the Y offset coordinate of the image currently being transferred into the of program 48. The OCR process according to program 48 uses the Y coordinate to know if it can process data on the image. The XCP 54 continues to track the document until the trailing edge is past the camera post value. The XCP 54 de-asserts the trigger for a valid frame signal. After the de-assert, the image subsystem 26 corrects for skew and crops, rotates and compresses the image of the document. At the same time program 48 is polling the image sub system 26 to see if the images are complete. When an image is reported as complete the program 48 requests the image be transferred to SCP 48. At the completion of the image in 48, a stacker complete message is sent across the serial link from XCP 54 to SCP 48. The data is queued up for output via the TCP/IP write to a network device. NNE represents the neural network engine for the hand print classifier.

ISIS/TWAIN are both industry standard scanner drivers to control the scanner by an outside computer via the SCSI interface connection. This is only used with the image option configuration.

It should be appreciated that the functionality indicated as distinctly identifiable hardware associated with the first, primary system computer 48 could take any of a variety of forms readily understood by practitioners in this field. For example, items 26 and 30 are shown as components or boards connected to processor 28, but these functions could alternatively be programmed in the primary system computer 48. Likewise, functions indicated at 26 and 31 could be programmed in computer 48. As another alternative, function 26 could be integrated with camera 24. The term "first data processing system" should be construed as broad enough to encompass 26, 28, 30, and 31 and the term "camera subsystem" should likewise be construed as broad enough to encompassing 24, 26, consistent with the context and the present invention.

It can be appreciated that all of the input from the transporter and associated sensors and electromechanical devices communicate as necessary with the primary computer, only through the secondary processor 50, via a serial link.

The invention claimed is:

1. In a document image scanner having (a) a transporter for conveying physical documents in spaced serial relation along a working distance; (b) an optical camera having a field of view along the working distance, for sensing optically differentiated information areas on each physical document as the physical document is conveyed; (c) an optical image processing system operatively associated with the camera, for producing a virtual optical image data file from the differentiated information areas sensed by the camera on the physical document; (d) sensors for determining the position of the conveyed physical document relative to the camera field of view; (e) a plurality of electro-mechanical devices for actuating the transporter; and (f) a data interface controller for receiving data from the sensors and controlling the electro-mechanical devices to transport the physical document; the improvement comprising:

a communications link between the data interface controller and the image processing system for synchronization by the data interface controller, of the physical document as conveyed and the virtual document image captured by the image processing system.

2. The image scanner of claim 1, wherein the communications link delivers a signal to the image processing system for timing the production of an image data file representative of the differentiated information areas on each document from the camera, based on signals from said sensors.

3. The image scanner of claim 1, wherein in response to signals from the sensors, the data interface controller sends a trigger control signal to the camera.

4. The image scanner of claim 2, wherein in response to the signals from the sensors, the reprogrammable second computer program sends a trigger control signal to the camera subsystem.

5. A high speed document image scanner comprising:
(a) a transporter for conveying documents in spaced serial relation along a working distance;
(b) a selectively triggered camera having a field of view along the working distance, for sensing differentiated information areas on each document as the document is conveyed;
(c) a first data processor under the control of a first operating system and operatively associated with the camera, for producing an image data file from the differentiated information areas sensed by the camera;
(d) sensors for determining the position of the conveyed document on the transporter;
(e) a plurality of electro-mechanical devices for actuating the transporter;
(f) a data interface associated with the sensors and the electro-mechanical devices;
(g) a first computer program executable in the first data processor, for controlling the production of the image data file representative of the differentiated information areas on each document;
(h) a second data processor under the control of a second operating system and logically associated with said data interface; and
(i) a reprogrammable second computer program executable in the second data processor, for receiving input signals from the data interface and based on the input signals, sending control signals to each of the electro-mechanical devices for controlling the transporter.

6. The image scanner of claim 5, wherein said second data processor is in communication with said first data processor only through a serial link over which the second data processor and delivers a signal to the first computer program for timing the production of an image data file representative of the differentiated information areas on each document from the camera subsystem, based on said input signals.

7. The image scanner of claim 5, wherein in response to the input signals, the reprogrammable second computer program sends a trigger control signal to the camera subsystem.

8. The image scanner of claim 6, wherein in response to the input signals, the reprogrammable second computer program sends a trigger control signal to the camera subsystem.

9. The image scanner of claim 5, wherein the first data processing system includes an image subsystem for processing a literal image of the differentiated areas on each document, and an optical character recognition subsystem, for alternatively processing a derived image of the differentiated areas on each document.

10. A high speed document image scanner comprising:
(a) a transporter for conveying documents in spaced serial relation along a working distance;
(b) a camera having a field of view along the working distance, and when triggered, sensing differentiated information areas on each document as the document is conveyed;
(c) a first data processor under the control of a first operating system and logically associated with the camera, for producing an image data file from the differentiated information areas sensed by the camera;
(d) sensors operatively associated with the transporter, for determining operating variables including the position of the conveyed document relative to the camera field of view;
(e) a plurality of electro-mechanical devices for actuating the transporter;
(f) a first computer program executable in the first data processor, for controlling the production of an image data file representative of the differentiated information areas on each document;
(g) a second data processor under the control of a second operating system and in communication with said first data processor through a serial link; and
(h) a reprogrammable second computer program executable in the second data processor, (1) for receiving input signals responsive to the sensed operating variables, and based on the sensed operating variables, computing and sending control signals to the electro-mechanical devices, and delivering to the camera a trigger signal responsive to the sensed operating variables, and (2) through said serial link, delivering a signal to the first computer program for timing the production of an image data file representative of the differentiated information areas on each document as sensed in the camera.

11. A high speed image scanner comprising:
(a) a document transporter having an input end for receiving a continuous stream of discrete documents of varying size from a feed source, a central portion for conveying the documents in spaced serial relation along a working distance, and a discharge end including a document stacker;
(b) a camera subsystem situated along the central portion of the transporter, for sensing differentiated information areas on each document as the document is conveyed, and generating a digitized sampling of said areas;
(c) a first data processor under the control of a first operating system and logically associated with the camera subsystem, for receiving the digitized samplings and producing an image data file representative of the differentiated information areas on each document;
(d) a plurality of sensors mounted on the transporter, for sensing operating variables including at least three of (1) the entry of a document from the feeder onto the central portion for conveyance, (2) the boundaries of the document, (3) the leading edge of the conveyed document as it enters the camera field of view, (4) the trailing edge of the conveyed document as it exits the camera field of view, and (5) the entry of a document into the stacker;
(e) a plurality of electro-mechanical devices and data interface means associated with the transporter, for receiving and implementing control signals for adjusting operating variables including (1) document feed rate, and (2) conveyor speed;
(f) a first computer program executable in the first data processor, for controlling the receipt of the digitized samplings in the first data processor and the production of an image data file representative of the differentiated information areas on each document;
(g) a second data processor under the control of a second operating system and logically associated with (1) said data interface means and (2) said first data processor; and
(h) a second computer program executable in the second data processor, (1) for receiving input signals responsive to the sensed operating variables, (2) based on the sensed operating variables, computing and sending control signals to the electro-mechanical devices for adjusting operating variables and (3) delivering to the first data processor, a signal responsive to the sensed operating variables whereby the first computer program controls the timing of the receipt of the digitized samplings in the first data processor and the production of an image data file representative of the differentiated information areas on each document.

12. The scanner of claim 11, wherein the first data processor is a general purpose PC under a Windows operating system and the second data processor is a programmable multithread real time controller.

13. The scanner of claim 11, wherein the first computer program includes a first sheet manager program defined by a series of coded logic instructions, the second computer program includes a second sheet manager program defined by a series of coded logic instructions, and at least some of the first and second sheet manager programs have identical coded logic instructions.

14. The scanner of claim 13, wherein the identical coded logic instructions of the first and second computer programs execute concurrently.

15. A high speed image scanner comprising:
(a) a document transporter having an input end for receiving a continuous stream of discrete documents of varying size from a feed source, a central portion for conveying the documents in spaced serial relation along a working distance, and a discharge end including a document stacker;
(b) a camera subsystem situated along the central portion of the transporter, for sensing differentiated information areas on each document as the document is conveyed, and generating a digitized sampling of said areas;
(c) a first data processor under the control of a first operating system and logically associated with the camera subsystem, for receiving the digitized samplings and producing an image data file representative of the differentiated information areas on each document;
(d) a plurality of sensors mounted on the transporter, for sensing operating variables including at least three of (1) the entry of a document from the feeder onto the central portion for conveyance, (2) the boundaries of the document, (3) the leading edge of the conveyed document as it enters the camera field of view, (4) the trailing edge of the conveyed document as it exits the camera field of view, and (5) the entry of a document into the stacker;
(e) a plurality of electro-mechanical devices and data interface means associated with the transporter, for receiving and implementing control signals for adjusting operating variables including (1) document feed rate, (2) conveyor speed, (3) camera, and (4) stacker.
(f) a first computer program executable in the first data processor, for controlling the receipt of the digitized samplings in the first data processor and the production of an image data file representative of the differentiated information areas on each document;
(g) a second data processor under the control of a second operating system and logically associated with (1) said data interface means and (2) said first data processor;
(h) a second computer program executable in the second data processor, (1) for receiving input signals responsive to the sensed operating variables, (2) based on the sensed operating variables, computing and sending control signals to the electro-mechanical devices for the operating variables, and (3) delivering to the camera subsystem, signals responsive to the sensed operating variables whereby the first computer program controls the receipt of the digitized samplings in the first data processor and the production of an image data file representative of the differentiated information areas on each document.

16. The image scanner of claim 15, wherein the first computer produces said image data file after confirmation that the document has entered the stacker.

* * * * *